Nov. 2, 1965   J. A. McINERNEY ETAL   3,215,399
DOUBLE DISC CONSTRUCTION FOR GATE VALVES
Filed May 28, 1962
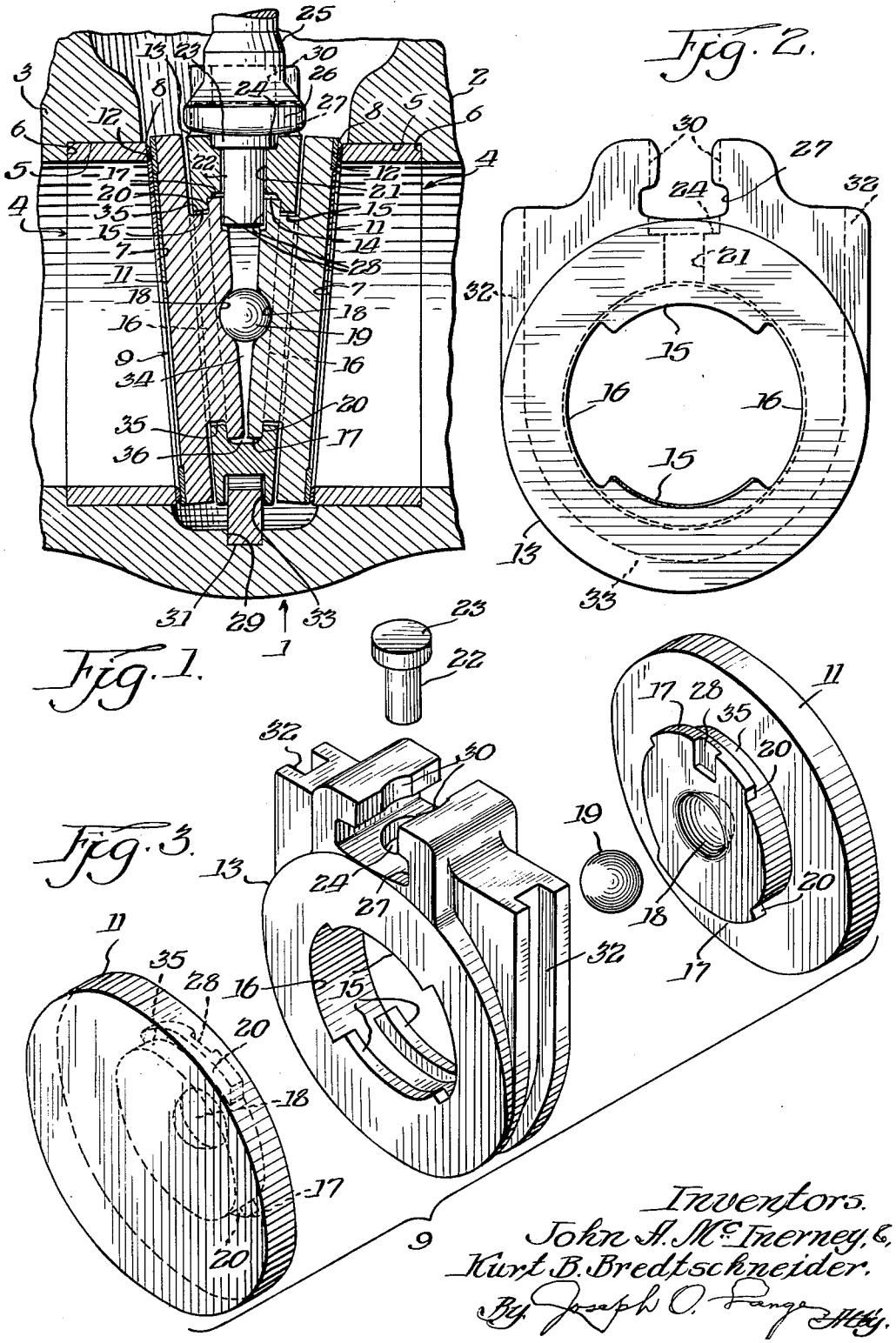
Inventors.
John A. McInerney, &
Kurt B. Bredtschneider.
By Joseph O. Lange Atty.

United States Patent Office 3,215,399
Patented Nov. 2, 1965

3,215,399
DOUBLE DISC CONSTRUCTION FOR
GATE VALVES
John A. McInerney, Evergreen Park, and Kurt B. Bredtschneider, Chicago, Ill., assignors to Crane Co., Chicago, Ill., a corporation of Illinois
Filed May 28, 1962, Ser. No. 198,245
2 Claims. (Cl. 251—195)

This invention relates generally to gate valves, and, more particularly, it is concerned with the design of a gate valve employing a novel double disc construction.

In order to acquire a better appreciation of the objects and advantages of this invention, it should be understood at the outset that heretofore in the field of high pressures and high temperatures steam service, there has been the objection that the flexible gates or closure members may be exposed to such severe conditions as to cause permanent distortion of the closure member, leading ultimately to valve leakage and failure in service.

It is therefore an important object of this invention to provide a gate valve in which separate detachable discs are employed for effecting positive fluid sealing engagement with the seat without danger of objectionable distortion.

A further important object of this invention is to provide for the assembly of relatively simple substantially circular discs in which uniform deflection in response to service conditions is easily, economically and conveniently provided.

A further important object is to provide in a gate valve for such relatively simple disc constructions which lend themselves readily to be made either forged or of bar stock or the like and thereby overcoming the necessity for usually employing radiographic inspection as is ordinarily necessary in connection with castings.

Another object is to provide for a gate valve employing a pair of discs for the valve seating contact having relatively uniform thickness and thereby conveniently permitting trouble-free deposits of the usual hard facing materials, for example, chromium-cobalt tungsten alloys, such as those known by the tradename "Stellite."

Another important object is to provide for a gate valve closure member employing comparatively uniform disc constructions in which the said discs in a carrier assembly are positively held against relative rotation by means of a lock pin or the like means.

A further object is to provide for a valve closure member assembly which comprises a carrier for the said discs and in which the latter members are positively positioned within the said carrier by means of what is commonly termed a bayonet connection.

Another important object is to provide a construction in which a form of a centrally positioned member, such as a spheroidal member or ball, provides a pivotal function and thus handles multiple plane disc alignment loading.

Another important object is to provide for a double disc gate valve construction in which the arrangement is made that as the discs are driven downward to the seating position, the said discs are being forced in desired seating position by a portion of the carrier, such as the hub. As said discs engage the valve seat rings, the construction permits in cooperation with the ball or sphere to provide the beneficial central loading and thereby permitting uniform distribution of stem thrust loading to the discs.

Another object is to provide a valve construction in which stem torque or rotational forces are not imposed on disc to prevent proper seating. The stem T-head engages the carrier and thus all stem torque is transmitted directly to the carrier and suitably restrained by carrier guides.

A further important object of this invention is to provide for a double disc gate valve construction in which as the discs are lifted by the carrier portions of the discs, such as by lugs thereon, to engage the carrier. Thus, said discs are positively withdrawn or disengaged from the valve seats.

Another important object is to provide for a multiple disc valve and carrier construction in which a central space or relieved portion provided for the reception of the ball or sphere allows for the interpositioning of a resilient means, such as a coiled spring therebetween, if deemed neceessary, in order to inhibit objectionable rattling, wear and vibration of the discs between said parts assembly.

A further important object is to provide for a double disc gate valve construction in which in view of the simplicity of the disc constructions used, reconditioning and easy adjustment of the valve seating is provided. This is done by simple grinding operations predeterminately of material from each disc face and removing predetermined amounts of material from each portion of the disc. Specifically, this is done by forming suitable lug shoulders which cooperate with the discs during the opening and closing of the valve as will hereinafter be explained at greater length.

Another object is to provide for a valve construction in which the reconditioned discs may easily be used repeatedly by the comparatively simple expedient of employing a predeterminately larger diameter sphere or ball therebetween.

Another important object is to provide for a double disc gate valve construction in which the carrier for said discs will not normally wear nor require replacement in service and thereby limit replacement costs to the discs only.

A still further important object is to provide functionally for a double disc construction in which the discs being separated permit that the stem thrust is applied directly to the respective seat discs. This is in striking contrast to solid wedge constructions of gate valves in which a substantial amount of stem thrust applied is required in order to distort and to force the disc into desired full sealing surface contact with the body seat rings in overcoming even minute misalignment arising from pipe line strains or distortion due to high temperatures and fluid pressures of the seat and the valve closure member.

Another important object is to provide for a valve construction employing a plurality of spaced apart discs in a carrier in which the vertical force component of the valve stem is beneficially transmitted to a shoulder portion of the carrier and cooperating with the hub portions of the disc with a force extending in a plane substantially parallel to the wedge face of the valve.

Another important object is to provide for a double disc gate valve construction in which there is such flexibility that the substantially uniform discs employed when subjected to temperature gradients within the valve will be less susceptible to thermal distortion than a solid wedge type of gate valve with its varying shapes and thicknesses.

A further object is to provide for a valve closure with a centrally positioned ball to serve as a temperature compensating device as hereinafter referred to. It is a well established fact that the valve body of a gate valve installed on high temperature service will normally contract more than the disc upon cooling after the disc has been seated while hot. This action pinches the disc and can result in sticking of the disc between valve seats requiring unusually high unseating torques and frequently causing costly damage to disc seating faces. Where the material of the ball has a coefficient of thermal expansion greater than the material of the valve body and disc on cooling of the valve the ball will contract and thereby compensate for the differences in body contraction.

Other objects and advantages will become more readily apparent upon proceeding with the specification read in light of the accompanying drawings, in which:

FIG. 1 is a fragmentary sectional assembly view of a double disc gate valve embodying our invention;

FIG. 2 is a front or face view of a disc carrier embodying our invention and constituting an important part of the gate valve closure member; and FIG. 3 is an exploded exterior view of the parts constituting the novel closure member of our invention.

Referring now to FIG. 1, in which a valve casing or body generally designated 1 is shown, having the ends broken away as at 2 and 3 to receive the usual valve end connections (not shown) for attachment to a pipe line. These connections may be flanged, threaded, welded, or otherwise attached, but since they form no part of this invention, they are conveniently omitted. The valve casing 1 is provided with the usual body seat rings generally designated 4 which in the construction illustrated are preferably received within a body recess 5.

The latter portion is shouldered as at 6, to receive said body seat rings 4. The latter rings are preferably held in position by suitable brazing attachment, welded or threaded, depending upon the type of valve employed and the service for which the valve is intended. In the usual manner of valves of this type, the inner face 7 of the seat rings 4 are tapered to receive a valve closure member in fluid sealing as hereinafter described. Preferably, although not necessarily, the said seat rings are provided with the hard facing 8, such as the type hereinabove referred to.

The real essence of this invention lies in the novel form of closure member generally designated 9, which primarily consists of a pair of oppositely disposed discs 11. The said discs 11 are preferably provided with a hard seating facing 12 for cooperation with the facing 8 of the seat rings 4 when the valve is in the closed position. The said closure member 9 in connection with its use of the discs 11 includes a hollow carrier 13 which as shown at inner portion thereof is provided with a chamber of substantially cylindrical configuration designated 14. The chamber 14 at its outer limits as at 15 is defined by the inwardly extending flanges 15. It will be noted by inspection of FIG. 2 that in providing for the bayonet connection referred to the flanges 15 are relieved on oppositely disposed side portions thereof as at 16 thereby to receive the arcuately disposed lugs 17 of the discs 11 with end limits defined by end surfaces 20. As also shown more clearly in the latter figure, it will be apparent that by the simple expedient of rotating each of the said discs predeterminately (90 degrees) engagement by the flange portions 17 with the oppositely disposed inwardly projecting flanges 15 of the carrier 13 takes place to provide positively locked engagement therebetween.

To aid in maintaining the said discs in suitably spaced apart relation to each other, each of the discs on their inner oppositely disposed surface portions are recessed at 18 to receive in nested relation therewith a spheroidal member such as the ball 19 whereby to not only allow for the spaced apart relationship between the discs referred to, but, as will hereinafter become more readily apparent, to allow also for pivotal adjustability of the discs in providing multiple plane alignment during the loading position or when the valve is in closed relationship to the casing.

The centrally positioned ball 19 also serves as a temperature compensating device to prevent disc being pinched in valve body on cooling after seating while hot on high temperature service. Ball 19 is made of a material having a relatively high coefficient of thermal expansion, such as, austenitic stainless steel which has a coefficient of expansion about 50% higher than carbon steel, and will contract more than the body upon cooling and avoid or minimize the occurrence of the disc becoming too tightly wedged in place. As a further aid in providing for seat tightness between the surfaces 8 and 12 respectively of the body seat ring and the closure member 13, the carrier 13 is apertured as at 21 whereby to receive the headed pin 22, the latter being headed at 23 at the outer end thereof. As shown more clearly in FIG. 1, the pin 22 is inserted for assembly with the carrier 13 by moving said pin past the relieved opposite surface portions 30 to engage respectively the aperture 21 of the carrier 13 and the relieved portions 28 of the discs 11, the head 23 of the pin shouldering at the disc carrier recess 24 whereby to inhibit disc rotation on the valve horizontal axis. The head 23 is thus suitably supported on the annular shoulder forming the base surface of recess 24. It will be noted that for purpose of actuating the gate closure member 9 which is of the reciprocally movable type, a valve stem 25 is employed having a T-head as at 26 engaging in the usual manner the recess 27 more clearly shown in FIG. 2 on the carrier 13. It also will be apparent that the stem T-head 26 cooperates with the headed portion 23 of the pin 22 by abutting against the latter portion when the closure member 9 is being seated as shown more clearly in FIG. 1. It will be appreciated that when the discs 11 are properly positioned in the carrier 13, the pin 22 is assembled with the carrier by initially moving the head 23 downwardly past the T-head surfaces 30 until the head of the pin is received in the carrier recess defined at 24. By reason of the engagement of the shank portion 22 of the pin projecting through the aperture 21 of the carrier and with the lower portion of the said pin engaging the oppositely disposed recess surfaces on the discs as indicated at 28, the discs 11 are positively locked against rotation relative to the carrier 13.

In connection with the reciprocating movement of the closure member 9 as hereinabove referred to, it is desirable but not absolutely indispensable that the casing 1 at 29 be recessed to receive what is termed by those skilled in the art as a horseshoe guide 31, the purpose being to guide the closure member during the reciprocating movement of the latter member by reason of the engagement by said guide of the oppositely disposed grooves 32. The latter is of U-form or horseshoe and thus joined by the curved portion thereof at 33 (see FIG. 2) to facilitate said accurate guiding of the closure member. It will be noted in referring to FIG. 1 that the arrangement of the discs 11 in their juxtaposition relationship illustrated provide for a chamber 34 therebetween a central portion of said chamber receiving the spacer ball 19.

It should also be understood that if and when it is desired to prevent rattling or vibration between the said discs 11 a coil spring (not shown) may be suitably mounted to surround the ball 19 and maintain said discs in desired spaced apart relationship.

In the valve closing operation, it will be understood that as the discs 11 are forced ultimately to the seated position shown, the neck surfaces 35 are contacted by the carrier upper hub surfaces at 15 and then as the said discs engage the respective seat rings 4, they are subsequently center loaded by means of the ball 19. This action by the means described provides the desirable uniform disc loading hereinabove referred to.

When the valve is being opened, it should be similarly apparent that the disc hub portions 35 at the lower portions thereof are engaged and lifted by the carrier 13. The respective disc lugs 17 at their lower portions are contacted by said carrier 13 and thus the discs are moved inwardly and disengaged from the valve seats 4. It will be appreciated that by virtue of the taper provided in the lower chamber portion 36, the contraction or withdrawal of said discs takes place as described.

While the above description has been largely concerned with the structure of the valve and its function or operation, it will be appreciated that an unusually convenient method of reconditioning the valve of this invention is also available by the construction employed. Specifically, new facings can easily be applied and refinished at 12 as desired, because of the relatively simple substantially cylindrical form of the said discs being suitable therefor for handling on a lathe in providing the necessary machining for hard facing the disc. In this connection of course if a new facing necessarily increases what is termed the disc gauge dimension, namely, the space between the seating contacts 8 and 8, this can easily be compenasted for by the employment of a larger ball 19 interposed in the chamber 34 between the recessed surfaces 18. It will also be understood that in connection with the refacing referred to that the lugs at 17 may be suitably machined to reduce the thickness thereof and also permit of the desired accurate adjustment with respect to the discs and the carrier, such as at the inner surface portion of the discs as indicated at 20.

In summary, it will be appreciated that a novel form of double disc gate valve has been provided, having exceptional flexibility, even under relatively high pressures and temperatures, together with uniform disc loading by means of a cooperating valve stem and pin facilitating the employment of relatively simple discs for effecting the desired seating contact and by the employment of a center positioned, temperature compensating ball obtain adjustment for any misalignment which might occur.

While only a single embodiment has been shown, it will be appreciated that this is only for purpose of illustration and not of limitation. Therefore, the measure of the scope of this invention should be interpreted in light of the appended claims.

We claim:
1. In a wedge gate valve having a ported casing with tapered seats;
 a closure member between said seats;
 the closure member comprising a hollow carrier and a pair of oppositely disposed discs in said carrier;
 the carrier having oppositely disposed apertures in alignment with the ports of the said casing;
 the said apertures being of a size and configuration to receive a portion of said discs;
 the latter discs being annularly formed on said portion received within the apertures of said disc carrier whereby upon predetermined rotation of said discs the latter are received and locked in said carrier apertures;
 adjusting means between said discs for effecting alignment thereof in all planes;
 the said adjusting means being of a material having a predetermined coefficient of expansion whereby said adjusting means functions as a temperature compensating means between said discs;
 actuating means for said closure member;
 the said actuating means cooperating with an annular portion of said carrier whereby to restrain said discs against further rotation.

2. In a wedge gate valve having a ported casing with tapered seats;
 a closure member between said seats;
 the closure member comprising a hollow carrier and a pair of oppositely disposed discs in said carrier;
 the carrier having oppositely disposed apertures in alignment with the ports of the said casing;
 the said apertures being of a size and configuration to receive a portion of said discs;
 disc alignment adjustment means comprising a freely rotatable ball member and relieved areas on said discs to receive said ball;
 the latter relieved areas being in a plane defined by the valve central axis when the valve is in a closed position;
 the latter discs being annularly formed on said portion received within the apertures of said disc carrier whereby upon predetermined rotation of said discs the latter are received and locked in said carrier aperture;
 stem actuating means having an enlarged inner end portion of inverted T-head configuration for engagement of the carrier portion of said closure member;
 a pin member having an enlarged head portion shouldered in an upper annular relieved portion of said carrier and having an inner portion thereof engaging said discs;
 the said actuating means cooperating with said carrier and said pin member whereby to retain said pin member within the carrier and restrain said discs against rotation, the T-head of said stem actuating means bearing in abutting relation against the enlarged head portion of the said pin member when seating the valve.

References Cited by the Examiner

UNITED STATES PATENTS 140,407  7/73  Eddy _____ 251—197

FOREIGN PATENTS 758,742  3/54  Germany.
613,266  11/48  Great Britain.
695,488  8/53  Great Britain.
696,083  8/53  Great Britain.

ISADOR WEIL, *Primary Examiner.*

CLARENCE R. GORDON, *Examiner.*